US008256081B2

(12) United States Patent
Fridman

(10) Patent No.: US 8,256,081 B2
(45) Date of Patent: Sep. 4, 2012

(54) BEARING REMOVER

(76) Inventor: Gideon Fridman, Fullerton, CA (US)

( * ) Notice: Subject to any disclaimer, the term of this patent is extended or adjusted under 35 U.S.C. 154(b) by 363 days.

(21) Appl. No.: 12/566,340

(22) Filed: Sep. 24, 2009

(65) Prior Publication Data

US 2010/0077584 A1 Apr. 1, 2010

Related U.S. Application Data

(60) Provisional application No. 61/100,329, filed on Sep. 26, 2008.

(51) Int. Cl.
*B23P 19/04* (2006.01)

(52) U.S. Cl. ................ 29/255; 29/270; 29/244; 29/266; 29/264

(58) Field of Classification Search .................... 29/255, 29/256, 257, 263, 264, 270, 280, 277, 278, 29/244
See application file for complete search history.

(56) References Cited

U.S. PATENT DOCUMENTS

| | | | | |
|---|---|---|---|---|
| 6,601,277 B1 * | 8/2003 | Swanson | ......................... | 29/256 |
| 6,886,228 B1 * | 5/2005 | Chen | ......................... | 29/263 |
| 7,415,754 B1 * | 8/2008 | Cargill et al. | ......................... | 29/263 |
| 7,496,999 B2 * | 3/2009 | Robarge | ......................... | 29/265 |
| 7,658,368 B2 * | 2/2010 | Laun | ......................... | 254/18 |
| 7,832,071 B2 * | 11/2010 | Klann | ......................... | 29/214 |
| 7,845,057 B2 * | 12/2010 | Hsiao | ......................... | 29/255 |
| 7,963,012 B1 * | 6/2011 | Brasher et al. | ......................... | 29/270 |
| 2010/0077584 A1 * | 4/2010 | Fridman | ......................... | 29/244 |

* cited by examiner

*Primary Examiner* — Lee D Wilson
(74) *Attorney, Agent, or Firm* — Fish & Associates, PC

(57) ABSTRACT

A bearing remover is configured to cooperate with a puller to remove a bearing from an axle. The bearing remover includes a claw that has an opening to receive a portion of the axle, and a lip that can be inserted between the bearing and the wall. The bearing remover also includes a centering component that fits about the axle. The claw and centering component are mechanically coupled to assist in maintaining the claw about the bearing, and to transmit a force to the claw.

11 Claims, 3 Drawing Sheets

FIG. 1
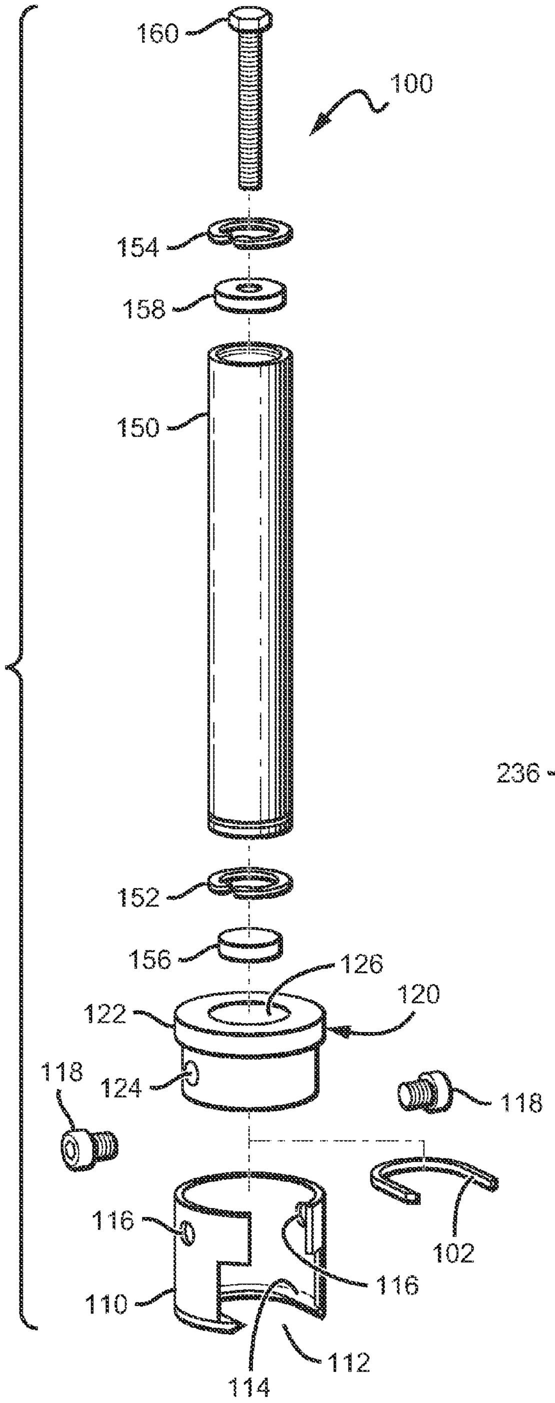
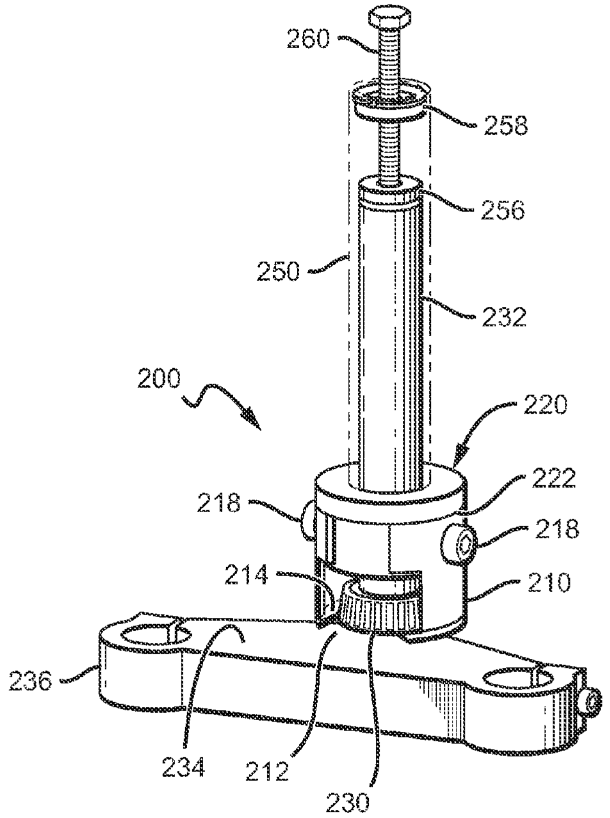
FIG. 2

BEARING REMOVER

This application claims priority to co-pending U.S. provisional application with Ser. No. 61/100,329 filed on Sep. 26, 2008, which is incorporated by reference in its entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bearing removers.

BACKGROUND

Traditional bearing removers have three arms, each of which grasps a bearing at 60° intervals around the base of the bearing. A pulling force is then applied to the arms to dislodge the bearing. Such bearing pullers are completely inoperable where there is insufficient space for the arms to grasp the bearing, such as where there is a wall or other surface that block the arms from having sufficient "purchase" against the bearing. The known bearing pullers are also inoperable where the bearing is positioned so far along an axle that the arms cannot practically be made long enough.

Expandable bearing removers are not limited by the space between a bearing and an adjacent surface. Such bearing removers typically have an expandable first section that is inserted within a center of the bearing and then expanded to the internal dimensions of the bearing. Once expanded, a second section is connected to the first section, and a pulling force is transmitted from the second section to the first section. However, such expandable bearing removers are still inoperable to remove bearings positioned far along an axle.

Thus, there is still a need for bearing removers configured to remove bearings from axles in locations having (a) limited space between the bearings and adjacent surfaces, and (b) where the bearing is positioned far along an axle.

SUMMARY OF THE INVENTION

The inventive subject matter provides apparatus, systems and methods that use a claw, a centering component, and a bearing puller. The claw and centering component are collectively referred to herein as a bearing remover.

Preferred claws have a horseshoe shape, and are sufficiently thin such that bearings can be removed where a side of the bearing is positioned within 5 mm of a dust cup or other surface. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The dimensions of the horseshoe shapes should accommodate lateral engagement of an axle, and therefore could have differing sizes to handle bearings on different sized axles. Preferred openings are configured to receive at least a 20° portion of the axle.

Preferred claws further include a lip that outwardly extends from an inner portion of the claw, where the lips are sized and dimensioned to be inserted between a bearing and a surface adjacent to the bearing. The lips preferably have a height of no more than 0.125 in (3.175 mm), although all other commercially practical heights are also contemplated. While the lips could extend the entire inner circumferences of the claws, the lips could alternatively extend from only a portion of the inner circumferences. The lips can have any commercially suitable shape, such that at least three areas of the lip contact the bearing. Contemplated shapes include, for example, horseshoe-like shapes, triangular shapes, square shapes, rectangular shapes, and any combination(s) thereof.

Lips are preferably heat-treated to at least 60° R (−239.8° C.) such that the lips can withstand a pulling force transmitted from the puller. In addition, the lip can advantageously comprise one continuous piece, which allows the pressure to be evenly distributed about the lip and permits the lip to have a reduced height.

Bearing removers described herein have particular application to motorcycle bearings for Harley Davidson™ motorcycles built after 1948 including all FLT Touring models, and for all original Indian™ motorcycles. In those motorcycles the lower steering stem bearings are positioned so far along axle, and so close to a wall, that prior art bearing pullers of any type are completely inoperable. In fact, the only way mechanics have been able to remove such bearings is to cut them off.

Contemplated bearing removers can optionally include an insert configured to increase the height of the claws' lips, and thereby adapt the lip to different bearings. One advantage of contemplated bearing pullers is that they can operate on tapered bearings, and even those where the outer race is damaged or missing.

A preferred centering component is removably coupled to a claw, and maintains the claw about the bearing. The centering component is preferably a round, polygonal or other shaped tube, although all commercially suitable configurations are contemplated. For example, the centering component could comprise columns that fit longitudinally about the axle.

The centering component needs to be mechanically or otherwise coupled to the claw. Typically the centering component would be removably coupled to the claw with bolts, but all practical alternatives are contemplated, including for example a permanent junction so that they function as a single unit.

Preferred centering components include an opening through which each of the puller and the axle extend. Once inserted through the opening, the puller can be coupled to the centering component by a mechanical fastener such as a bolt or screw, although all commercially-suitable fasteners are contemplated. Such fasteners permit pulling force to be transferred from the puller to the claw. The pulling force could also be additionally exerted through the centering component.

Alternatively or additionally, the centering components can include one or more catches configured for a puller to grasp. Such catches include for example, ledges or other protrusions, hooks, and so forth. Preferred catches have sufficient strength to withstand a pulling force of at least 50 pounds.

Contemplated pullers include all commercially suitable puller configured to cooperate with the centering component, such as cylindrical and other shaped tubes or semi-tubes, at least two columns disposed coupled together at each of the columns' ends, a three-arm puller, and any combination(s) thereof.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is an exploded view of a bearing remover.

FIG. 2 is a perspective view of a bearing remover.

DETAILED DESCRIPTION

Figure 3:
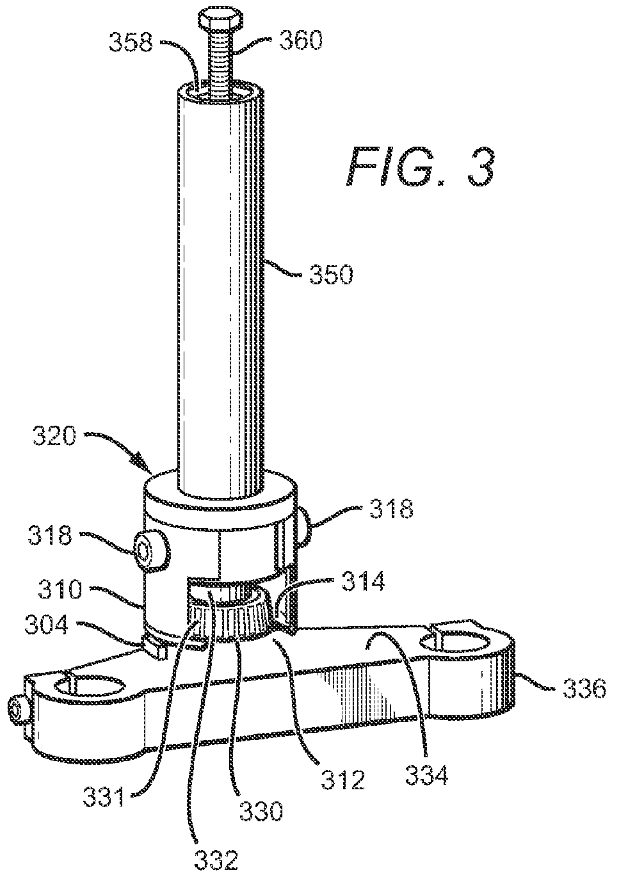
FIG. 3 is an alternate perspective view of a bearing remover.

In FIG. 1, bearing remover 100 cooperates with puller 150 to remove a bearing (not shown) from an axle (not shown). Bearing remover 100 includes a claw 110 coupled to a centering component 120, although it is contemplated that the claw and centering component could be a single unit.

Claw 110 has a horseshoe shape, and includes an opening 112 configured to receive a semi-circle portion of the axle (not shown). Claw 110 further includes a lip 114 that also has a horseshoe shape, and which outwardly extends from an inner portion of the claw 110 such that the lip 114 can be inserted between a bearing (not shown) and an adjacent surface (not shown).

Optionally, insert 102 can be placed within claw 110 on lip 114 such that the height of lip 114 can be adapted to bearings of different configurations including for example, damaged bearings (e.g., bearings lacking outer races) and bearings of various sizes and dimensions.

Claw 110 further includes apertures 116 that mate with apertures 124 on the centering component 120. The apertures 116 and 124 are sized and dimensioned such that bolts 118 can be inserted through the apertures 116 and 124, which mechanically couples the claw 110 to the centering component 120. It is contemplated that any commercially-suitable fasteners could be used to couple the claw 110 to the centering component 120 including, for example, other mechanical fasteners (e.g., screws, nails, clips, and snaps), glue and other adhesives, magnets, and any combination(s) thereof.

Centering component 120 has a ledge 122 configured such that the ledge 122 rests upon an upper portion of the claw 110 when the claw 110 and centering component 120 are coupled. The centering component 120 also includes an opening 126 sized and dimensioned such that a puller 150 can extend into the centering component 120. While the centering component 120 has a cylindrical shape, other shapes and configurations are also contemplated including, for example, triangular, square, rectangular, ovular, and so forth.

Puller 150 is a hollow, elongated cylinder sized and dimensioned such that an axle (not shown) can be at least partially inserted within puller 150. It is contemplated that the puller 150 could have other shapes and configurations including for example, a square shaped, triangular, or other shaped tube, a semi-tube, two or more rods, a three arm puller, and/or any combination(s) thereof. "C"-shaped rings 152 and 154 are positioned near the ends of puller 150 to maintain the position of puller 150 relative to the position of the axle (not shown).

Puller 150 couples to the centering component 120 using bolts 118. Puller 150 transmits a pulling force to the centering component 120 and claw 110.

Puller 150 is secured to the axle (not shown) by use of spacer 158 that includes an opening 159 through which a fastener 160 can extend. An axle protector 156 can be positioned between the axle (not shown) and the fastener 160 such that the axle is protected from any pulling force applied to the puller 150.

FIG. 2 illustrates an assembled bearing remover 200 that is mounted to a bearing 230 disposed about an axle 232. Bearing remover 200 includes a claw 210 coupled to centering component 220 and puller 250 by fasteners 218.

Claw 210 has a horseshoe shape with an opening 212 configured to receive an at least 20 degree portion of axle 232. Claw 210 further includes lip 214 that also has a horseshoe shape, Centering component 220 is sized and dimensioned such that the centering component 220 can be inserted with claw 210. Centering component 220 has a ledge 222 that rests upon claw 210.

Puller 250 comprises a hollow, elongated cylinder that is sized and dimensioned such that axle 232 can extend through puller 250. Puller 250 is tightened in place using spacer 258 that is inserted within puller 250 and includes an opening (not shown) through which fastener 260 can extend. An axle protector 256 can be inserted within puller 250 and positioned between the axle 232 and fastener 260 such that the axle 232 is protected from the fastener 260.

Once the puller 250 is secured to the axle 232, a pulling force can be applied to the puller 250 that is transmitted to the claw 210 and thereby displaces the bearing 230 from its position on the axle 232.

In FIG. 3, a bearing remover 300 is shown in its assembled state, and as positioned about a lower bearing 332 of a steering stem 336 of a motorcycle such as an Indian motorcycle, for example. A side 331 of lower bearing 332 is disposed within 5 mm of wall 304. With respect to the remaining numerals in FIG. 3, the same considerations for like components with like numerals of FIG. 2 apply.

Figure 4:
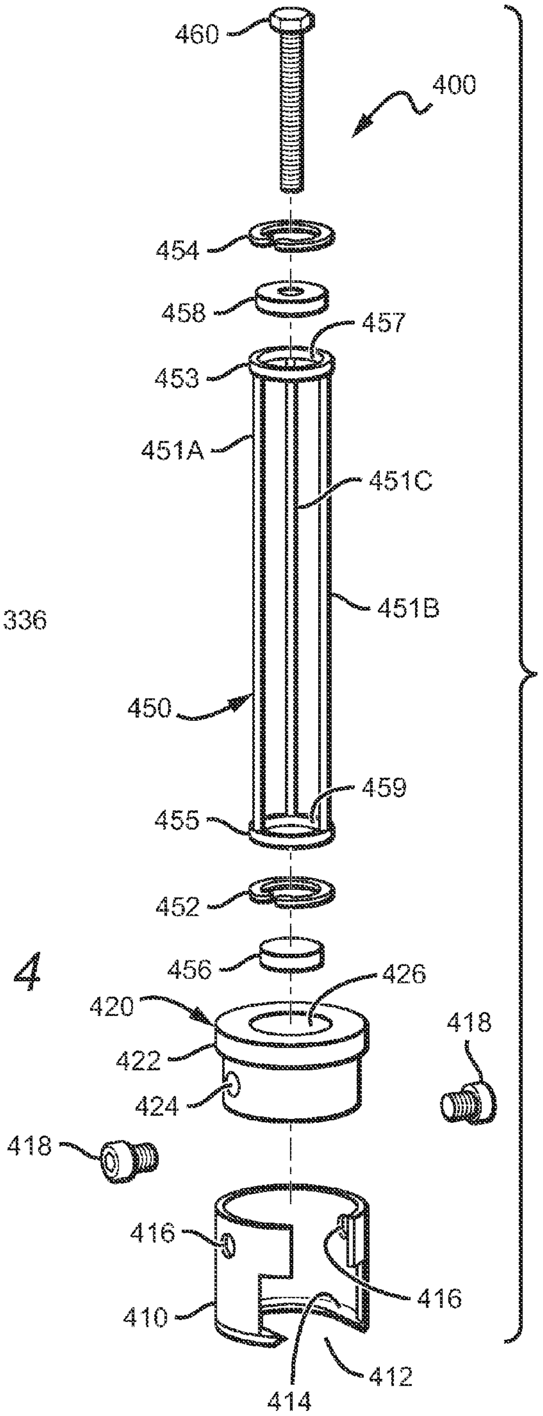
FIG. 4 is an exploded view of another bearing remover.

Another embodiment of a bearing remover 400 is shown in FIG. 4 that cooperates with a puller 450 to remove a bearing (not shown). Puller 450 comprises three rods 451A-C that are coupled together at each end by respective coupling components 453 and 455. The rods 451A-C are preferably positioned in equal distances around an axle (not shown). It is contemplated that two or more rods could be used such that the position of puller 450 relative to the axle (not shown) is maintained. In this instance, and where other upper limits are not expressly stated, the reader should infer a reasonable upper limit. In this instance, for example, a commercially reasonable upper limit is about 15.

Coupling components 453 and 455 can have any commercially suitable size and dimension and are preferably circular in shape. Coupling components 453 and 455 are disposed at each ends of rods 451A-C such that the position of each rod is maintained relative to adjacent rods. The coupling components 453 and 455 each include an opening 457 and 459, respectively, through which an axle (not shown) can extend. With respect to the remaining numerals in FIG. 4, the same considerations for like components with like numerals of FIG. 1 apply.

Figure 5:
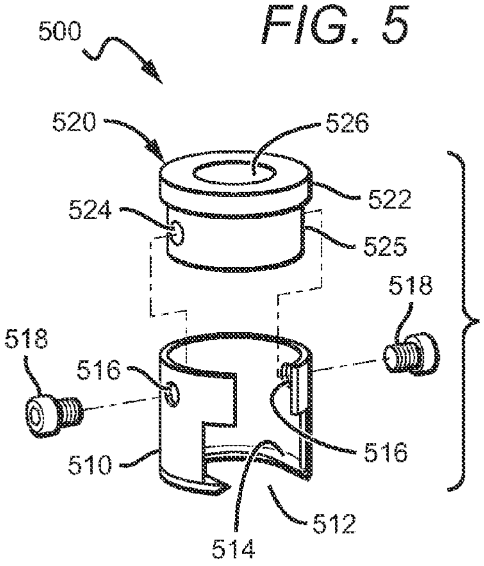
FIGS. 5-8 are exploded views of alternative embodiments of bearing removers.

In FIG. 5, a bearing remover 500 is shown having a claw 510 and a centering component 520. Centering component 520 is sized and dimensioned such that a portion of the centering component 520 can be inserted within claw 510. Centering component 520 includes a catch 522 configured such that the catch 522 outwardly extends from the centering component 520 and claw 510 when the centering component 520 and claw 510 are coupled. Preferably, the catch 522 extends at least 5 mm, and preferably at least 10 mm, from a side 525 of the centering component 520 such that a puller (not shown) can grasp the catch 522, and thereby transmit a pulling force to the centering component 520. Catch 522 should be able to withstand a pulling force of at least 50 pounds. With respect to the remaining numerals in FIG. 5, the same considerations for like components with like numerals of FIG. 1 apply.

Figure 6:
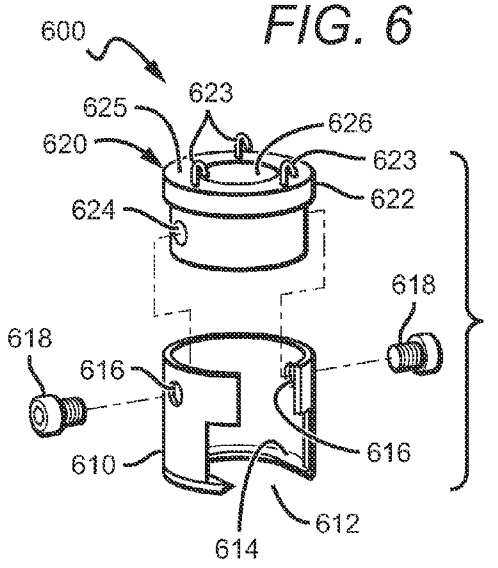

FIG. 6 illustrates an alternate embodiment of a bearing puller 600 having a claw 610 and a centering component 620. Centering component 620 includes a plurality of hooks 623 on an upper surface 625 of the centering component 620. The hooks 623 are positioned such that a puller (not shown) can be coupled to the hooks 623, and thereby transmit a pulling force to the centering component 620 and claw 610. With respect to the remaining numerals in FIG. 6, the same considerations for like components with like numerals of FIG. 1 apply.

Figure 7:
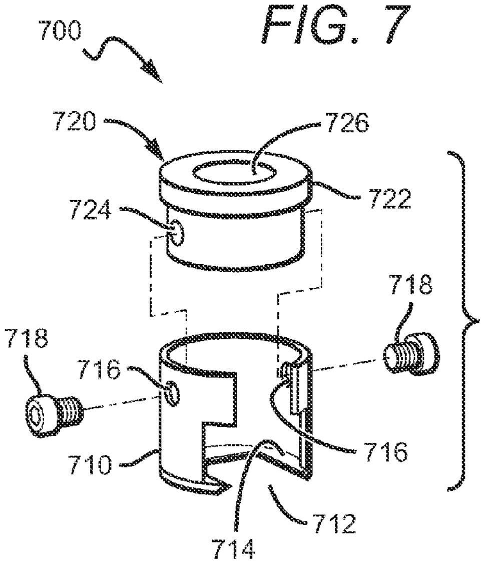

FIG. 7 illustrates a bearing puller 700 that includes a claw 710 and a centering component 720. Claw 710 includes a lip 714 having a square shape that extends from an inner portion of the claw 710. With respect to the remaining numerals in FIG. 7, the same considerations for like components with like numerals of FIG. 1 apply.

Figure 8:
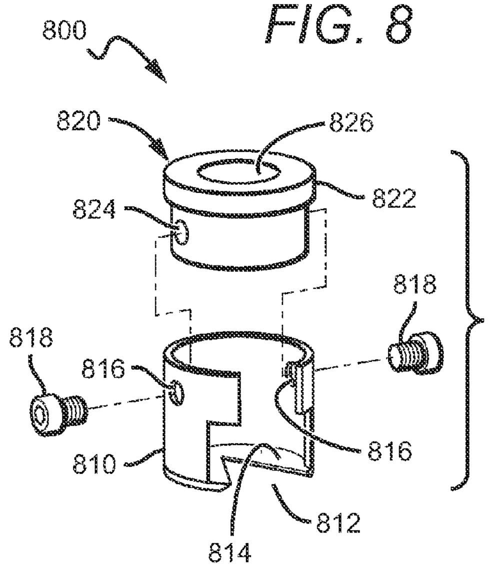

FIG. 8 illustrates a bearing puller 800 that includes a claw 810 and a centering component 820. Claw 810 includes a lip 814 having a triangular shape that extends from an inner portion of the claw 810. With respect to the remaining numerals in FIG. 8, the same considerations for like components with like numerals of FIG. 1 apply.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A bearing remover configured to cooperate with a puller to remove a bearing from an axle, comprising:

a puller including an elongated member with a top and bottom, and a drive member;

a claw detachably coupled with the puller, and having a shaped lip that extends from a bottom portion of the claw, wherein the claw and lip have a longitudinal open slot therethrough configured to receive a semi-circle portion of an axle; and a centering component that fits about the axle, and mechanically couples to the claw using one or more fasteners in a manner that assists in maintaining the claw about the bearing, and transmits a pulling force from the puller to the claw.

2. The bearing remover of claim 1, wherein the claw is configured to receive a semi\-circle portion of the axle of at least 20 degrees.

3. The bearing remover of claim 1, wherein the centering component further comprises a catch having sufficient strength to withstand the pulling force where the pulling force is at least 50 pounds.

4. The bearing remover of claim 1, wherein the lip has a horseshoe shape.

5. The bearing remover of claim 1, wherein the lip has a square shape.

6. The bearing remover of claim 1, wherein the lip has a triangular shape.

7. The bearing remover of claim 1, further comprising a mechanical coupling between the puller and the centering component such that the pulling force is transmitted from the puller to the claw.

8. The bearing remover of claim 1, further comprising an insert configured to adapt the lip to the bearing.

9. The bearing remover of claim 1, wherein the lip is sized and dimensioned to remove a steering stem bearing from a motorcycle.

10. The bearing remover of claim 1, wherein the lip is sized and dimensioned to remove a lower steering stem bearing from a Harley Davidson motorcycle built after 1948, wherein the lower steering stem bearing has the same configuration as a lower steering stem bearing of a Harley Davidson motorcycle built in 1949.

11. The bearing remover of claim 1, wherein the lip is sized and dimensioned to remove a lower steering stem bearing from an original Indian motorcycle.

* * * * *